US005933178A

United States Patent [19]

Ueno et al.

[11] Patent Number: 5,933,178

[45] Date of Patent: Aug. 3, 1999

[54] MULTI-STYLUS HEAD AND PROCESS FOR PRODUCING THE SAME

[75] Inventors: Noboru Ueno; Akinori Ushikoshi; Fumito Komatsu; Yuki Nakamura, all of Nagano, Japan

[73] Assignee: Kabushiki Kaisha Sankyo Seiki Seisakusho, Nagano, Japan

[21] Appl. No.: 09/033,684

[22] Filed: Mar. 3, 1998

Related U.S. Application Data

[63] Continuation of application No. 08/519,028, Aug. 24, 1995, abandoned.

[30] Foreign Application Priority Data

Sep. 5, 1994 [JP] Japan .................................... 6-234467
Aug. 24, 1995 [JP] Japan .................................... 6-220795

[51] Int. Cl.[6] ................................ B14J 2/39; B14J 2/395; B14J 2/40; B14J 2/41; G01D 15/16; G01D 15/18

[52] U.S. Cl. .......................... 347/148; 347/141; 347/145; 346/139 C

[58] Field of Search .................................... 347/148, 145, 347/141; 346/139 C; 369/126; 29/592.1

[56] References Cited

U.S. PATENT DOCUMENTS 4,417,391 11/1983 Rutherford et al. .................... 347/148
4,427,988 1/1984 De Kermadec et al. ............... 347/147
4,975,719 12/1990 Komatsu ................................ 347/148
5,530,690 6/1996 Ueno et al. ............................. 347/148

*Primary Examiner*—N. Le
*Assistant Examiner*—Thinh Nguyen
*Attorney, Agent, or Firm*—Sughrue, Mion, Zinn, Macpeak & Seas, PLLC

[57] ABSTRACT

Odd- and even-numbered conductors of recording electrodes, for example, first or second recording electrodes, are divided in the direction in which the conductor at the time of winding are stacked up to form different layers so as to increase the distance between the conductors of the adjoining recording electrodes and reduce the floating electrostatic capacitance.

10 Claims, 15 Drawing Sheets

MULTI-STYLUS HEAD AND PROCESS FOR PRODUCING THE SAME

This is a continuation of application Ser. No. 08/519,018 filed Aug. 24, 1995 now abandoned.

BACKGROUND OF THE INVENTION

1. Field of the Invention

The present invention relates to a multi-stylus recording head fit for use as an electrostatic recording head and a process for producing the same. More particularly, the present invention relates to improvements in the structure and method of connecting the recording electrodes of a multi-stylus recording head to a wiring board.

2. Related Art

A multi-stylus recording head, for example, a same-side control type multi-stylus recording head for use in an electrostatic recording system generally has, as shown in FIGS. 14 and 15, two rows of recording electrodes 101, 102 formed with conductors 108 arranged densely in the form of a cross-stitch with a constant pitch, and two rows of control electrodes 103, 104 corresponding to the recording electrodes 101, 102, the recording and control electrodes being fixedly incorporated in an electrode support block 105 of insulating resin. For example, with M (e.g., 128) pieces as one set, M×N (e.g., 55)=7,040 pieces of the first electrodes 101, M×N (=7,040) pieces of the second electrodes 102 arranged in parallel to the first ones with a predetermined space held therebetween, and the control electrodes 103, 104 arranged along and outside the respective rows of the first and second recording electrodes 101, 102, are provided so that each of the edge faces of the control electrodes 103, 104 is exposed on the surface of the electrode support block 105 of the insulating resin.

In this case, the leading end portions of the conductors 108 normally form the first and second recording electrodes 101, 102, respectively. In order to simplify the driving circuit required, the conductors 108 of the recording electrodes are grouped together and each group is connected to a wiring board 106 once before being connected to the driving circuit. In the case of the first recording electrodes amounting to M×N pieces, for example, N pieces of conductors 108 of the recording electrodes which belong to the same group are collected out of the N sets of recording electrode groups and soldered to one terminal 107 of the wiring board 106, so that the conductors 108 are put together in the M pieces of terminals. On the other hand, the second recording electrodes 102 are also grouped together before being soldered to the opposite side of the wiring board 106 (not shown). The terminals 107, . . . , 107 are connected via connectors (not shown) to the driving circuit, whereby voltage is applicable to any given recording electrodes 101, 101.

The recording electrodes of the multi-stylus recording head and the terminals on the wiring board are wired in the relation shown in FIG. 16. For example, the leftmost recording electrode 101 of the conductor 108 is connected to the first terminal 107; the second recording electrode 101 to the second terminal 107; and then the third recording electrode 101 to the third terminal 107. In this manner, the 1st–128th recording electrodes are each connected to the 1st–128th terminals 107 successively, and then the 129th–256th recording electrodes are each connected to the 1st–128th terminals 107, . . . , 107 successively. This process is repeated N times so as to distribute M×N (=7,040) pieces of recording electrodes 101 among the terminals 107, . . . , 107 in 128 places for wiring purposes.

With the conventional wiring structure, 7,040 pieces of conductors 108 are stacked up while being made to cross each other between the electrode support block 105 and the terminals 107, so that the whole (7,040 pieces) is formed into a layer 109 like a sheet of woven stuff as shown in FIG. 14. As to the second recording electrodes 102, moreover, these are wound like in the same order before being formed into a layer 109 like woven stuff. Consequently, the conductors 108, 108 of the two adjoining recording electrodes are positioned too closely; the problem is that the floating electrostatic capacitance tends to grow large. When the electrostatic floating capacitance is large, it is known that good recording is impossible because the applied voltage drops and because the driving voltage waveform becomes dull. In a recording pattern called an intermediate planar image where about half the electrodes alternately repeat recording•non-recording (ON•OFF) as shown in FIGS. 17(A) and (B), the pattern will be affected seriously by the floating electrostatic capacitance due to the dropping of the applied voltage.

In this case, the dropping of the applied voltage is caused by the fact that the current flows from the ON recording electrode side to the OFF recording electrode side along the path of the floating electrostatic capacitive coupling. More specifically, the dropping of the applied voltage is caused by the following mechanism:

1) The recording electrodes 101, . . . , 101 of the multi-stylus recording head and its driving circuit are arranged in a push-pull circuit system as shown in FIG. 18. When the recording electrode 101 is OFF (non-printing), for example, an upper-stage driver IC111 is turned on and a lower-stage driver IC112 is turned off so as to hold the recording electrode 101 at the ground potential. When the adjoining recording electrode 101 is ON (printing) then, an upper driver IC113 is turned off and a lower driver IC114 is turned on, whereby −260 V, for example, is applied to the recording electrode 101.

2) At this time, there arises a difference in voltage between both the recording electrodes 101, 101 and both the conductors 108, 108 and the current route created then allows the current to flow so as to charge a kind of capacitor 115 as the electrostatic floating capacitance formed therebetween.

3) An excessive current flows at the time the driver pulse rises and the applied voltage is dropped as the current causes the applied power to be excessive in capacitance.

As shown in FIG. 19 indicating the dependence of the effective applied voltage on the floating electrostatic capacitance at the time a pattern is drawn [0011], the greater the dropping degree of the applied voltage is, the greater the floating electrostatic capacitance grows. Because of the large floating electrostatic capacitance, the conventional multi-stylus recording head has been able to deal with line drawings having a low printing percentage but not with recording planar images having a relatively large printing percentage.

SUMMARY OF THE INVENTION

An object of the present invention is to provide a multi-stylus recording head characterized by small floating electrostatic capacitance, the less frequent dropping of the applied voltage, and the driving voltage waveform which is prevented from becoming dull. Another object of the present invention is to provide a process for producing a multi-stylus recording head in which the defective wiring and disconnection of conductors for use as recording electrodes hardly occur.

The aforementioned floating electrostatic capacitance C becomes large in proportion to an increase in the distance between adjoining conductors in a case where the length and sectional radius of the conductor are predetermined as shown by the following numerical formula:

$$C=(\pi\cdot\in L)/\ln\{(d-r)/r\}$$

where π=circular constant; ∈=dielectric constant of a substance between conductors; L=length of conductor; d=conductor-to-conductor distance; and r=sectional radius of conductor.

Since the odd-numbered and even-numbered conductors are so wired that the former and the latter are separated to form different layers in the direction in which these are stacked, the space between the adjoining recording electrodes is widened. Consequently, the floating electrostatic capacitance is reduced in the severest recording pattern causing the voltage drop, that is, the [0101] pattern in which ON•OFF are alternately repeated. In addition, a low-permittivity separator member for separating the layer having a set of even-numbered conductors from what has a set of odd-numbered conductors in the multi-stylus recording head is inserted therebetween according to the present invention, whereby the distance between the conductors corresponding to the adjoining recording electrodes is widened further. Therefore, it is not feared that the distance thus maintained is narrowed.

According to an aspect of the present invention, there is provided a multi-stylus recording head comprising: a plurality of recording electrodes with conductors arranged linearly, wherein the odd-numbered conductors and even-numbered conductors as viewed from one end side of the recording electrodes thus arranged linearly are divided in the direction in which the conductors are stacked up to form different layers.

According to another aspect of the present invention, there is provided a process for producing a multi-stylus recording head comprising the steps of: continuously supplying a conductor as a recording electrode via a supply nozzle to a drum-like winding jig; preforming the relative linear movement of the supply nozzle in the axial direction and at least one of the rotation and rocking motion of the winding jig relative to the supply nozzle to wind the conductor on the winding jig so as to make the conductors linear with a predetermined pitch, wherein the inner diameter of the leading end of the conductor passage hole of the supply nozzle is made not greater than twice the winding pitch, and wherein after the linear recording electrodes are alternately wound on the winding jig, the remaining recording electrodes are wound thereon.

As set forth above, the odd- and even-numbered conductors of the recording electrodes in the multi-stylus recording head are divided in the direction in which the conductors are stacked up to form the different layers according to the present invention. Therefore, the distance between the adjoining conductors of the recording electrodes is increased (the space being widened) and the floating electrostatic capacitance is reduced. According to the experiments made by the present inventors, the floating electrostatic capacitance has been roughly halved in comparison with the conventional construction of FIG. 14. Thus the driving waveform and the applied voltage are each prevented from becoming dull and dropping, so that high-quality drawing becomes possible.

As the separator member having a low dielectric constant is inserted in between the conductor layers, the distance between the conductors corresponding to the adjoining recording electrodes is lengthened further to ensure that the distance is maintained and the possibility of narrowing the distance is eliminated. Thus drawing with higher image quality and stability becomes possible.

According to the present invention, further, the movement of the conductor drawn out of the supply nozzle is regulated within one pitch in the conductor passage hole, whereby the conductor is wound in position as designated without being led to a place equivalent to the adjoining pitches. Therefore, the pitch is always restrained from being put out of order, and not only conductor arrangement precision but also productivity is rendered greatly improvable.

Moreover, the conductor drawn out of the supply nozzle is smoothly drawn out without being stuck in the conductor passage hole, so that wire damage (including disconnection) and the level of defectiveness are greatly reduced.

Further, the freedom of the movement of the conductor drawn out of the supply nozzle is not restricted even though the peripheral ridge of the supply nozzle outlet is chamfered into a curved surface, whereby the conductor can be wound in position.

In addition, since the process of producing the multi-stylus recording head according to the present invention includes winding the conductor by using the supply nozzle having the conductor passage hole whose inner diameter at its leading end is set not greater than twice the winding pitch, the motion of the conductor in the conductor passage hole of the supply nozzle is regulated with the effect of allowing the conductor to be wound in position and consequently any defective resulting from the slipping-off the groove is minimized. Consequently, it is possible to obtain a multi-stylus recording head with excellent precision in the arrangement of conductors and improved recording accuracy.

DETAILED DESCRIPTION OF THE PREFERRED EMBODIMENTS

Referring to the accompanying drawings, a detailed description will subsequently be given of an embodiment of the present invention.

Figure 1:
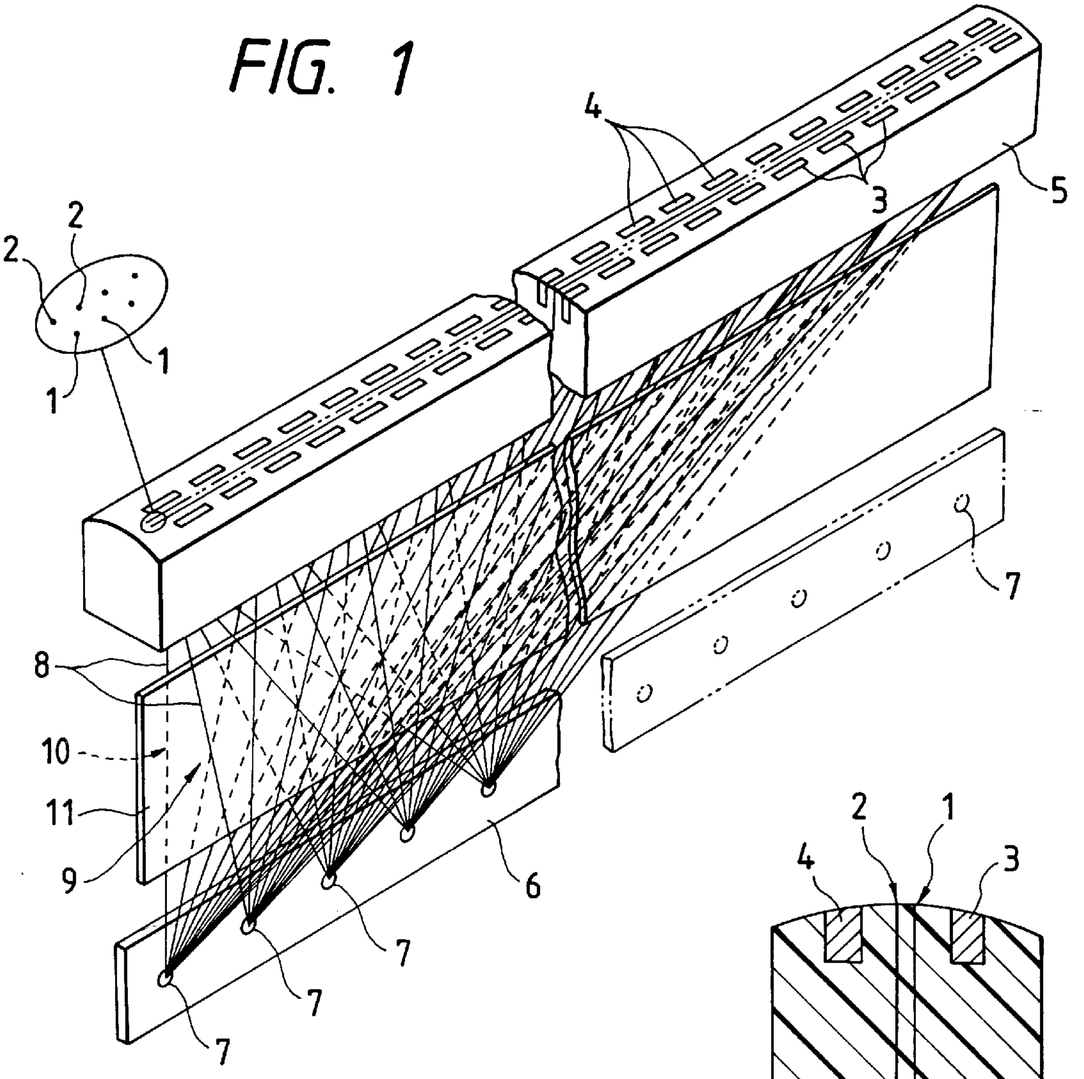
FIG. 1 is a perspective view of a multi-stylus recording head embodying the present invention.
Figure 2:
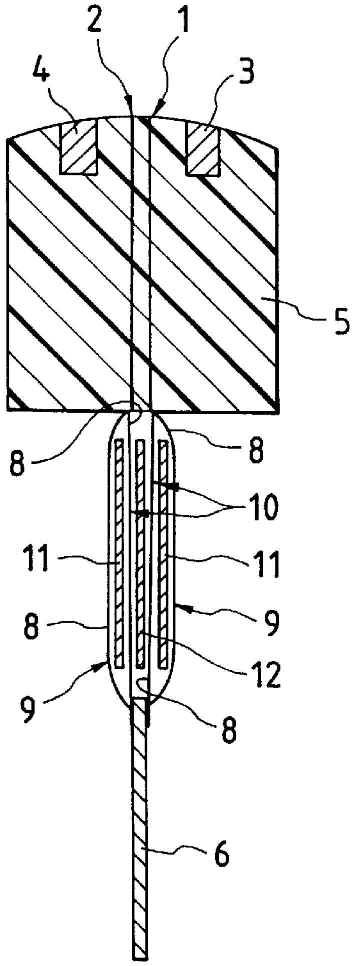
FIG. 2 is a transverse sectional view of an embodiment of the present invention.

FIGS. 1 and 2 show a same-side control type multi-stylus recording head embodying the present invention. The multi-stylus recording head has a first and a second recording electrodes 1, 2 formed with the leading end portions of two rows of conductors 8 arranged densely with a constant pitch, and two rows of control electrodes 3, 4 corresponding to the recording electrodes 1, 2, the recording and control electrodes being fixedly incorporated in an electrode support block 5 of insulating resin. For example, with M (=128) pieces as one set, M×N (=55) (=7,040) pieces of the first electrodes 1, and M×N (=7,040) pieces of the second electrodes 2 arranged in the form of a cross-stitch with a predetermined space held with respect to the first electrodes 1 constitute the first and second recording electrodes 1, 2.

In order to simplify the driving circuit required, the conductors 8 are collected together on the basis of recording electrodes to be grouped together and each group is connected to a terminal 7 of a wiring board 6 before being connected to the driving circuit (not shown). In the case of the first recording electrodes 1 amounting to M×N pieces, for example, the conductors 8 of the recording electrodes which belong to the same group out of N sets of recording electrode groups are collected together, so that N pieces of conductors 8 are collectively connected to one of the terminals 7 of the wiring board 6. The first electrodes 1 are divided into M groups and put together into M pieces of terminals 7, . . . , 7. Simultaneously, out of the first recording electrodes 1, . . . , 1 divided into the groups of M, the groups of odd-numbered conductors 8 and those of even-numbered conductors 8 are divided in the direction in which these are stacked up to form different layers 9, 10. Further, a separator member 11 such as paper having a dielectric constant smaller than that of air is inserted in between the group layer 9 of the odd-numbered conductors and the layer 10 of the even-numbered conductors. With respect to the second recording electrodes 2 likewise as shown in FIG. 2, on the other hand, the groups of the conductors 8 of the odd-numbered recording electrodes and the groups of the even-numbered conductors 8 are divided in the direction in which these are stacked up to form different layers 9, 10, and a separator member 11 having a dielectric constant smaller than that of air is inserted therebetween. Moreover, a separator member 12 such as paper having a dielectric constant smaller than that of air is also inserted in between the conductor group of the first recording electrodes 1 and the group of the second recording electrodes 2.

In this case, wires coated with an electrically insulating material such as urethane-coated wires are normally employed as the conductors 8, 8 for the recording electrodes.

Figure 3:
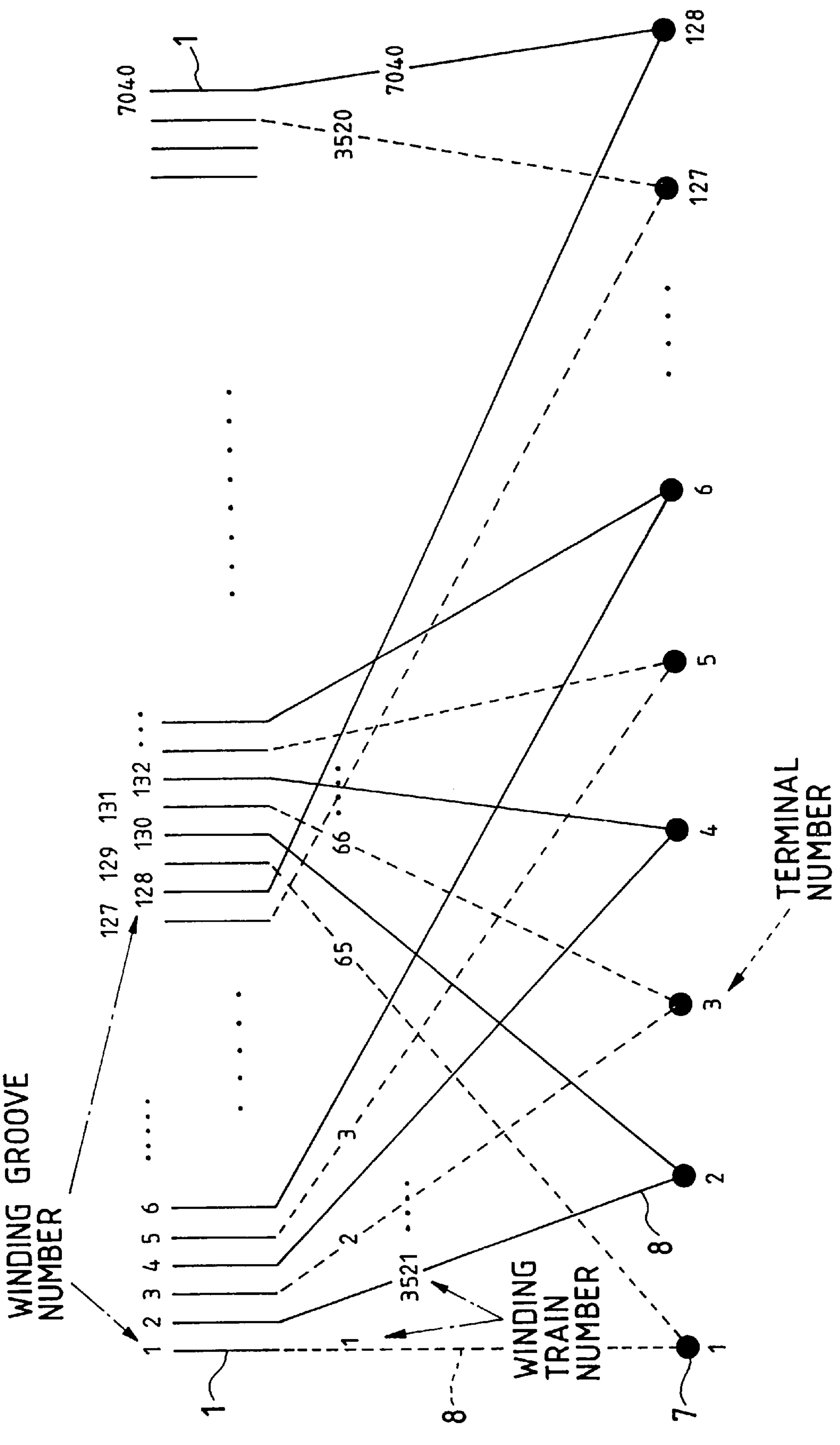
FIG. 3 is a conductor wiring diagram illustrating a method of winding a conductor of the multi-stylus recording head according to the present invention.
Figure 7:
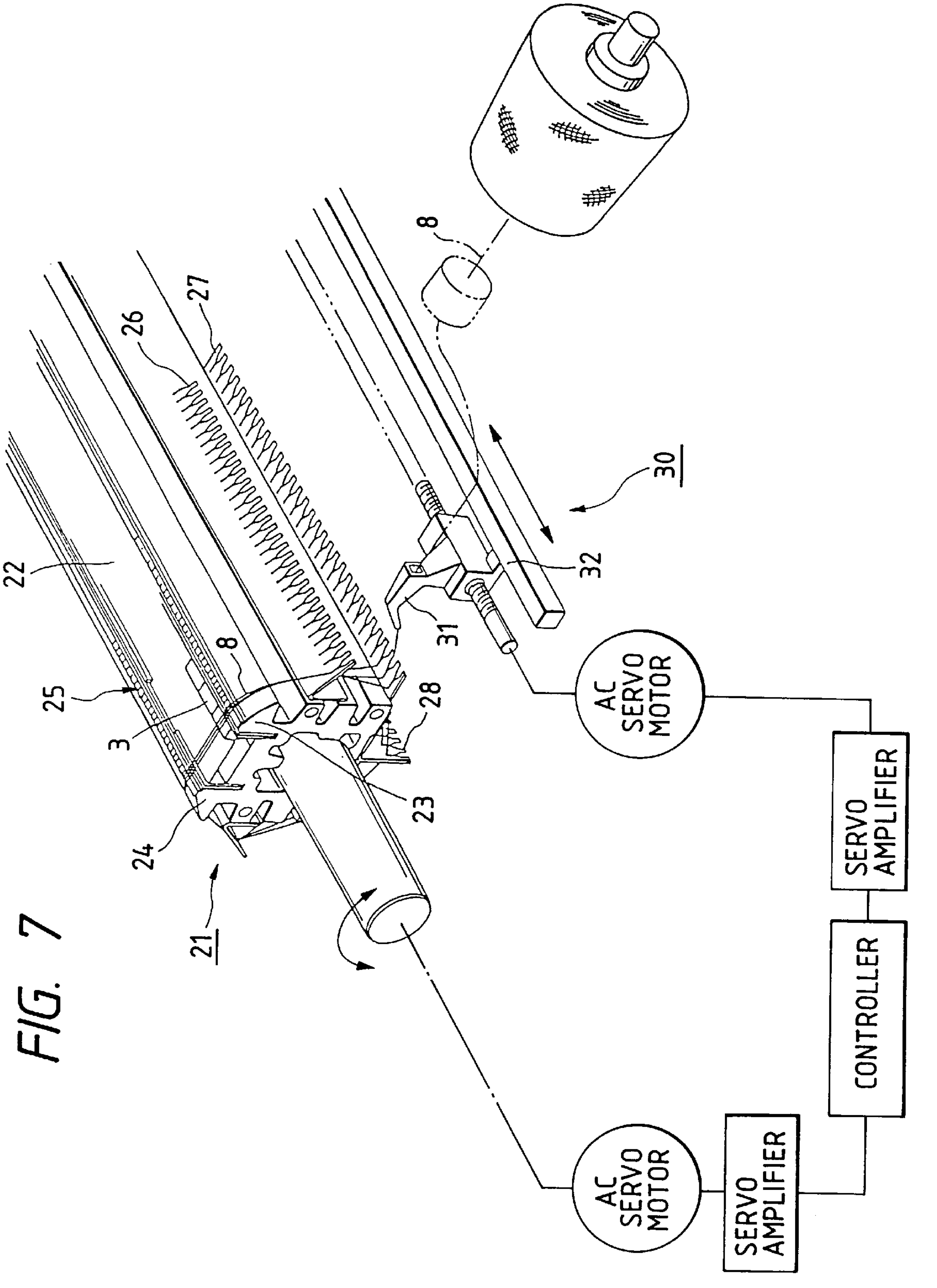
FIG. 7 is a perspective view illustrating a wiring jig and a conductor supply means in combination by way of example.

A winding jig of FIG. 7, for example, is used for forming the recording electrodes of the multi-stylus recording head like this in the winding order shown in FIG. 3. For convenience of illustration, the first recording electrodes 1 are taken by way of example in FIG. 3. The wiring relation is illustrated as in FIG. 3 by showing the first recording electrodes 1 in place of winding grooves (wire holding grooves) of the winding jig of FIG. 7, and the terminals 7 on the wiring board in place of pins each for bundling conductors 8 to be grouped.

As shown in FIG. 3, the conductors 8 are arranges so that the 1st–127th odd-numbered recording electrodes 1, . . . , 1 are each connected to the terminals 7, . . . , 7: namely, the 1st recording electrode 1 at the upper leftmost end is connected to the 1st terminal 7; the 3rd recording electrode 1 to the 3rd terminal; and the 5th recording electrode 1 to the 5th terminal. Then the 129th recording electrode and those which follow are each connected to the 1st terminal 7 and those which follow in such a wiring manner that 64 pieces of odd-numbered recording electrodes up to the 255th recording electrodes are each connected to the odd-numbered terminals 7, . . . , 7. The wiring work of connecting M/2 (=64) pieces of recording electrodes 1, . . . , 1 to M/2 (=64) pieces of odd-numbered terminals 7, . . . , 7 is repeated N (=55) times so as to successively connect the odd-numbered recording electrodes 1, . . . , 1 to the odd-numbered terminals 7, . . . , 7. In other words, (M/2)×N (=3,520) pieces of recording electrodes 1, . . . , 1 in total are separately connected to the terminals at 64 (M/2) places with 55 pieces per place. Then 3,520 pieces of odd-numbered conductors 8, . . . , 8 are stacked up in the form of a cross-stitch, and these form the layer 9 like a sheet of woven stuff as a whole. Further, the separator member 11 such as paper having a dielectric constant smaller than that of air is mounted and then the even-numbered recording electrodes 1, . . . , 1 and the terminals 7, . . . , 7 are wired together.

As the separator member 11, use may be made of, in addition to paper, a plastic film such as a PET (Polyethylene Terephthalate) film or fibrous cloth having a dielectric constant smaller than that of air.

The wiring of the even-numbered recording electrodes 1 and the terminals 7 is carried out through the same procedure that has been following in the aforementioned odd-numbered case. More specifically, the conductors 8 are wired so that M/2 (=64) pieces of 2nd–128th even-numbered first recording electrodes 1, . . . , 1 are connected to the 2nd–128th even-numbered terminals 7, . . . , 7 at M/2 (=64) places. Subsequently, the conductors 8 are wired so that the 130th–256th even-numbered first recording electrodes 1, . . . , 1 are connected to the 2nd–128th even-numbered terminals 7, . . . , 7. Then the wiring work is repeated N (=55) times with respect to 3,520 pieces of up to 7,040th even-numbered first recording electrodes 1, . . . , 1 to connect 55 pieces of conductors to the respective terminals 7, . . . , 7 at 64 (M/2) even-numbered places. Through this work, (M/2)×N (=3,520) pieces of conductors 8, . . . , 8 in total are stacked up in the form of a cross-stitch, and these form the layer 10 like a sheet of woven stuff as a whole.

When, therefore, M×N (7,040) pieces of first recording electrodes 1, . . . , 1 are wound at the odd- and even-numbered places, these are formed into the two layers 9, 10 divided by the separator member 11 in the direction in which the conductors 8 are stacked up, whereby the adjoining recording electrodes are shifted from each other in the direction in which these recording electrodes are stacked up.

The winding method is applied to the second recording electrodes 2 likewise. The layer 9 of the conductors 8, . . . , 8 of the odd-numbered recording electrodes and the layer 10 of the conductors 8, . . . , 8 of the even-numbered recording electrodes are formed, and the separator member 11 is inserted in between the layers. In this case, it is preferred to separate the first recording electrodes 1 from the second recording electrodes 2 by inserting the separator member 12 having a low dielectric constant in between the fabric layers 9, 9 of the first and second recording electrodes 1, 2.

Although the winding work can be done manually, an automatic winding apparatus should preferably be used. For example, the winding jig and the conductor winding means shown in FIG. 7 are usable for winding the conductors readily and quickly. In this case, the wire is wound from one end of the winding jig 21 to the other with one pitch skipped. In other words, the even-numbered recording electrodes 1, . . . , 1 are wound after all the odd-numbered recording electrodes 1, . . . , 1 are wound up. Automatic winding is extremely advantageous in that any winding work can be dealt with by altering the winding program.

Figure 8A:
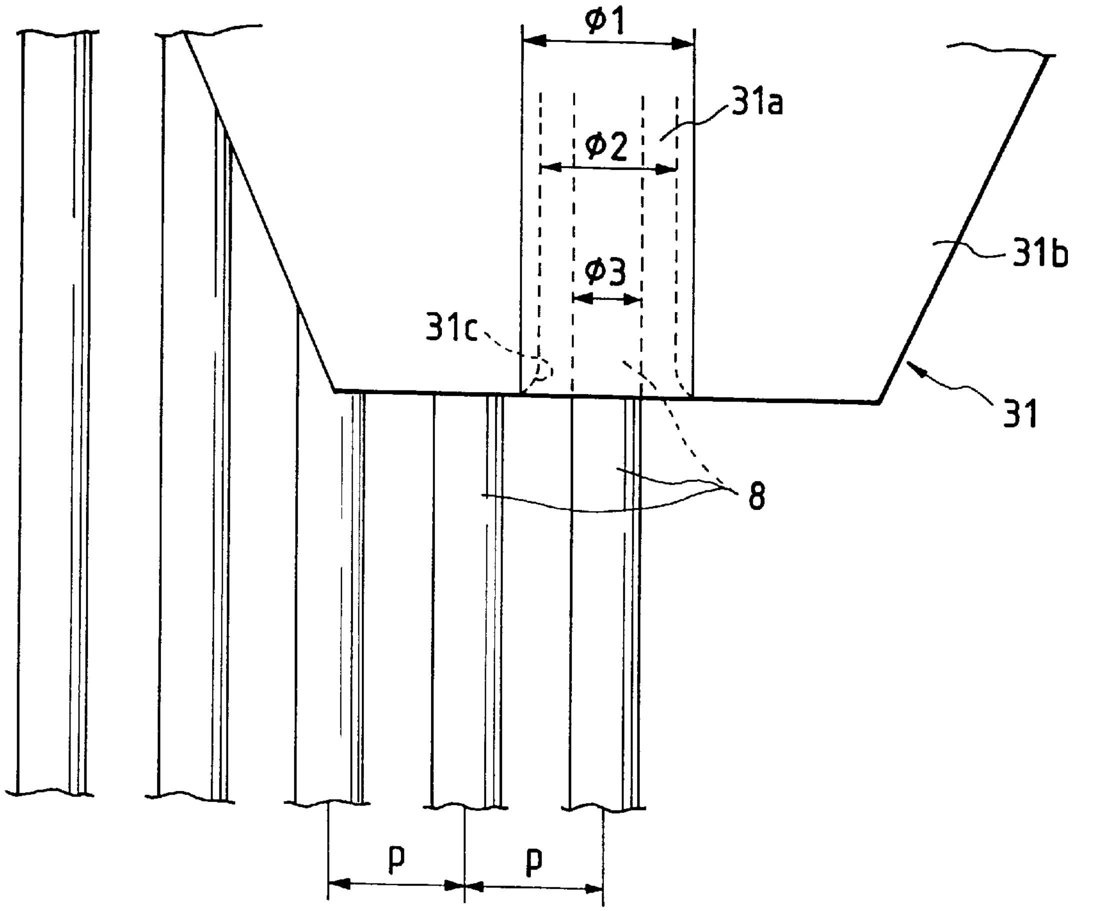
FIG. 8(A) is a top view of the structure of a supply nozzle for use in the present invention and its winding condition: (A)
Figure 8B:
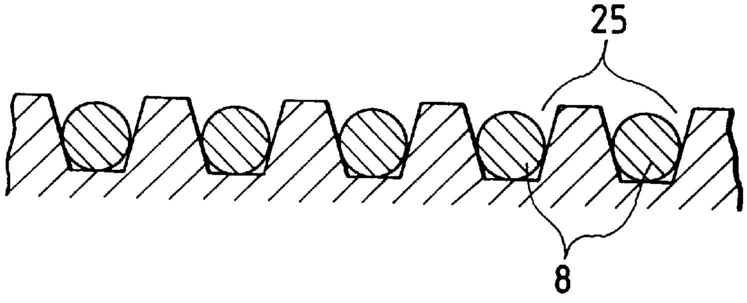
FIG. 8(B) is a partial sectional view of the structure of a supply nozzle for use in the present invention and its winding condition.
Figure 10:
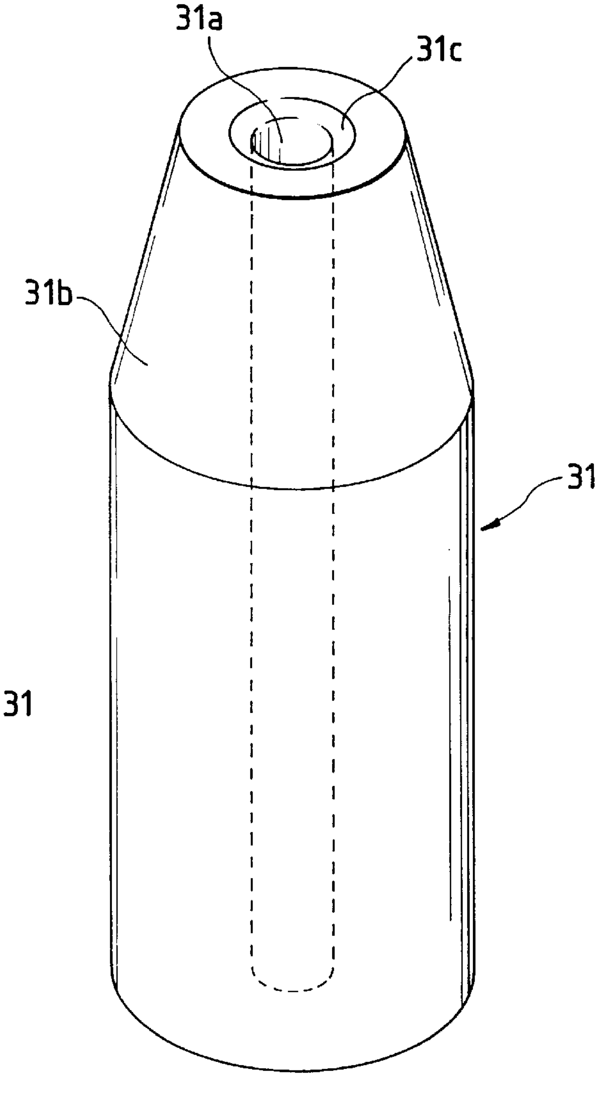
FIG. 10 is a perspective view of the supply nozzle according to the present invention.
Figure 9:
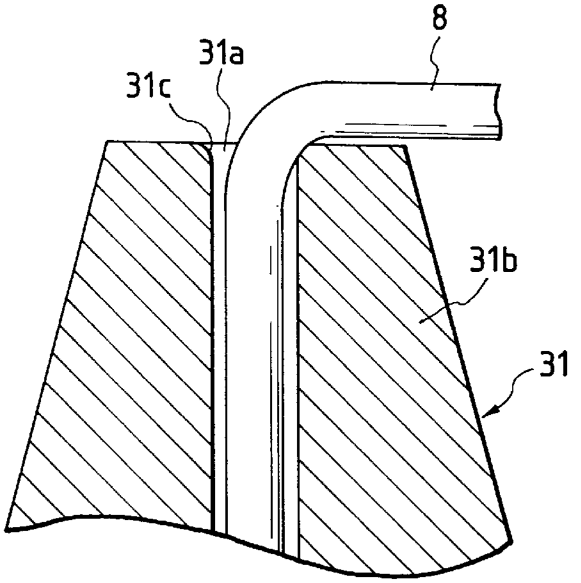
FIG. 9 is a sectional view of the leading end portion of the supply nozzle according to the present invention.

Referring to FIGS. 8 and 9, a description will subsequently be given of a conductor supply nozzle 31 for use in manufacturing a multi-stylus recording head according to the present invention.

The supply nozzle 31 is a very small tube having a totally circular cross section and provided with not only a hole 31*a* having a diameter of 2ϕ through which the urethane-coated conductor 8 passes but also an external conical leading end portion 31*b*. The wire is wound by the winding jig 21 of FIG. 7, the conductor 8 being placed with a predetermined pitch P in wire holding grooves 25 formed in the edge of a cavity groove 22 for use in resin injection molding. As shown in FIG. 8, further, the inner diameter ϕ1 of the leading end of the supply nozzle 31 is set greater by 1.2 times than the winding pitch P. Moreover, the inner periphery of the conductor passage hole 31*a*, particularly the peripheral ridge 31*c* of the conductor outlet is polished to provide a smooth curved surface. In this practice of the invention, the peripheral ridge 31*c* is polished so that it has a curved surface with a curvature radius of 0.1×ϕ2. The diameter ϕ2 of the conductor passage hole 31*a* and the winding pitch P of the conductor 8 are of the same length, whereas the diameter ϕ3 of the conductor 8 is made half the diameter ϕ2 and the pitch P.

In this case, the inner diameter ϕ1 of the leading end of the conductor passage hole 31*a* of the supply nozzle 31 is required to be not greater than the double of the winding pitch P. Moreover, the curvature radius R of the curved surface of the peripheral ridge 31*c* should be within the range obtained from the following equation:

$$(1/100)\phi 2 \leqq \text{curvature radius R of the curved surface of peripheral ridge} \leqq (1/2)\phi 2$$

where ϕ2=inner diameter of the conductor passage hole of supply nozzle.

Figure 11A:
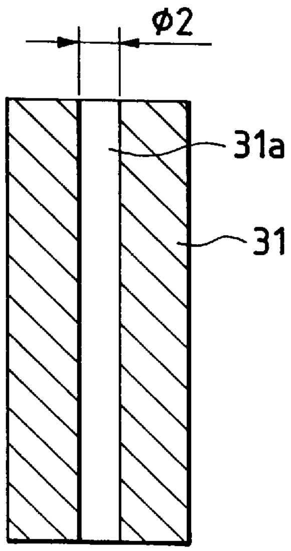
FIGS. 11A–11C represent views of a supply nozzle production process according to the present invention.
Figure 11B:
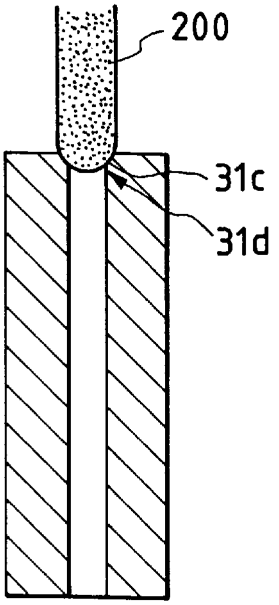
Figure 11C:
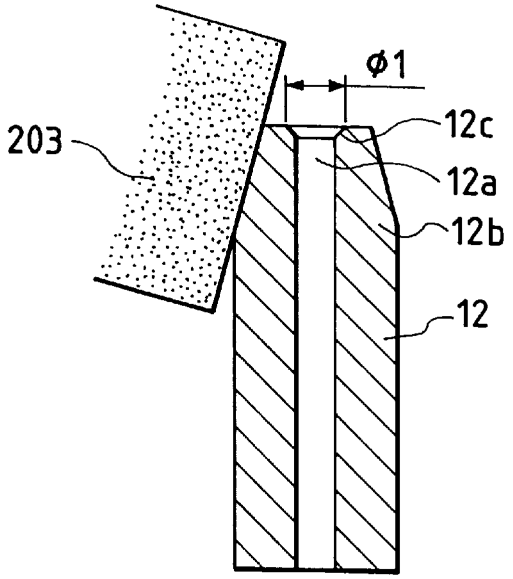

The supply nozzle 31 is manufactured as follows:

A very small tube having an inner diameter of ϕ2, predetermined thickness and surface roughness is prepared and cut in lengths. More specifically, a very small tube having a predetermined length with the conductor passage hole 31*a* having a diameter of ϕ2 is formed as shown in FIG. 11(A). Then the peripheral ridge 31*c* of the leading end of the conductor passage hole 31*a* is chamfered with a shaping grindstone 200 having a semicircular tip so that the peripheral ridge 31*c* may have an inner diameter of ϕ1. Subsequently, the inner part 31*d* and the inlet part 31*f* of the peripheral ridge 31*c* or chamfered portion of the peripheral ridge 31*c* are R-polished, that is, polished to provide a smooth curved surface. As a representative example of the R-polishing technique, there is the olive process for polishing the aforementioned inner part by passing a thin wire through the nozzle hole. As shown in FIG. 11(C) then, a shaping grindstone 203 is used to shape the outer periphery of the leading end of the supply nozzle 31 to form the conical leading end portion 31*b*.

Figure 13:
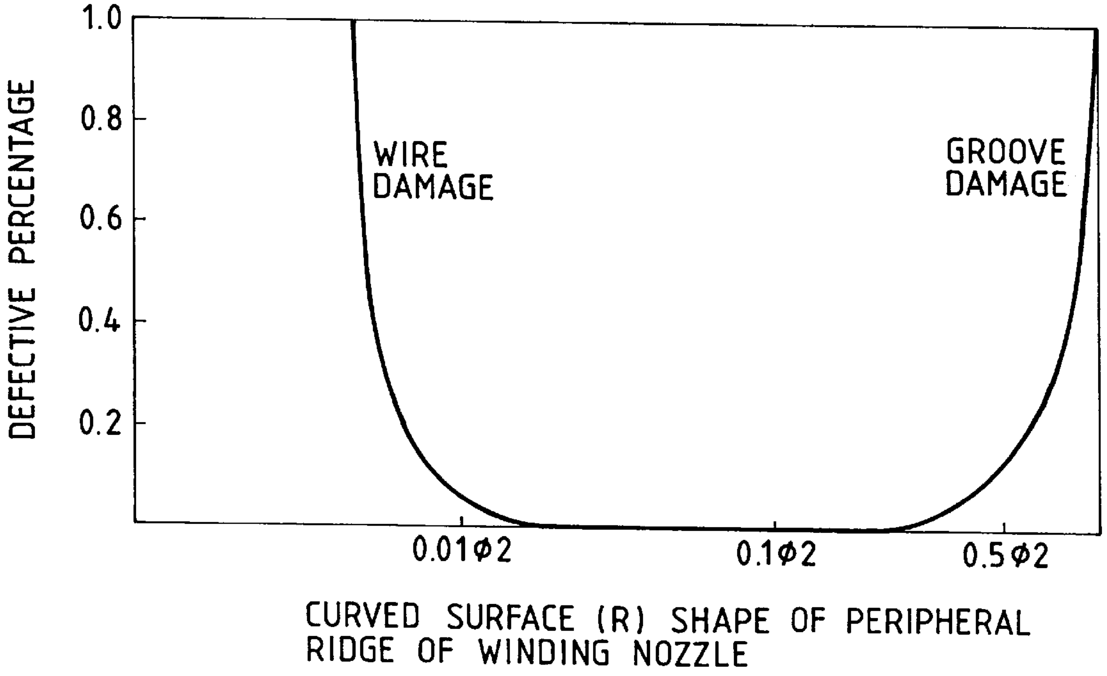
FIG. 13 is a graphic representation with the x-axis representing the curvature radius R of the curved configuration of the peripheral ridge inside the conductor passage hole of the supply nozzle and with the y-axis representing the level of defectiveness of the multi-stylus recording head.

FIG. 13 shows the relation between the curved surface (R) shape of the peripheral ridge 31*c* of the conductor passage hole 31*a* and a defective percentage (the number of defectives per multi-stylus recording head having two rows of recording electrodes). Nonconformity such as slipping-off the groove or wire damage (including disconnection) will not arise while the value of the curvature radius R of the peripheral ridge 31*c* of the conductor passage hole 31*a* ranges from 0.02×ϕ2 to 0.2×ϕ2. However, the wire damage is caused when the value becomes smaller than 0.02×ϕ2. This is because the peripheral ridge 31*c* abuts against the conductor 8 at an acute angle. When the value becomes greater than 0.02×ϕ2, on the other hand, the slipping-off the groove is caused because if the value of the curvature radius R of the peripheral ridge 31*c* becomes excessively great, the freedom of the conductor 8 at the leading end of the supply nozzle 31 also becomes too great, which results in causing the conductor to run off the wire holding groove 25.

In order to increase the multi-stylus recording head production yield, the percentage of rejects such as slipping-off the groove and wire damage (including disconnection) ought to be 0% ideally. In other words, it is most preferred to maintain the value of curvature radius R of the peripheral ridge 31*c* between 0.02×ϕ2 and 0.2×ϕ2. However, since the level of defectiveness has heretofore exceeded 1, all the defective parts have been repaired and if it is possible to decrease the proportion defectives to less than 15%, the yield will greatly be improved. In view of this, the value of the curvature radius R of the peripheral ridge 31*c* should preferably be set between 0.01×ϕ2 and 0.5×ϕ2. In this practice of the invention, the inner diameter ϕ1 of the leading end of the conductor passage hole 31*a* is set equal to the double of the winding pitch P when the value of the curvature radius R of the peripheral ridge 31*c* is 0.5×ϕ2.

Figure 12:
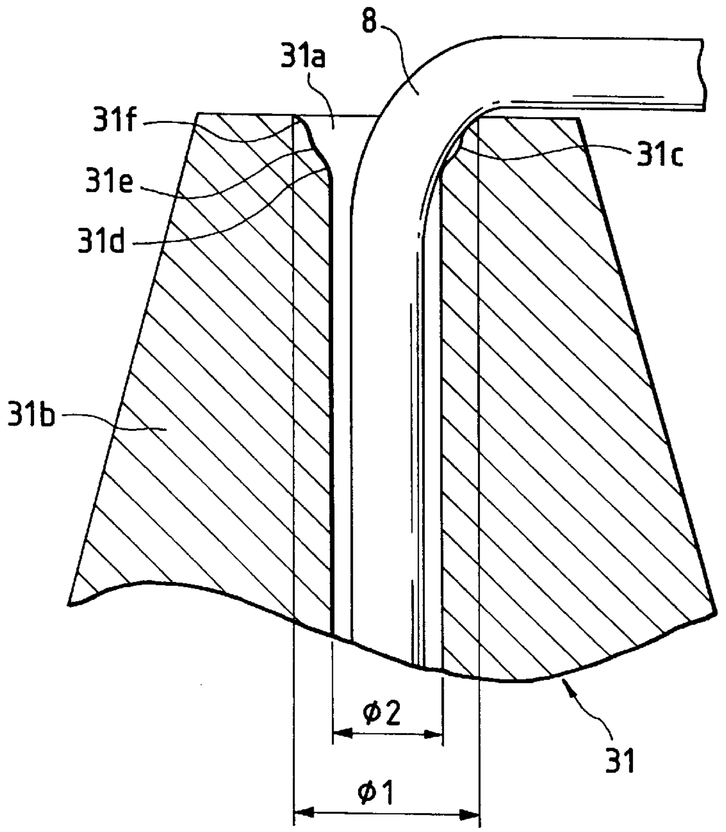
FIG. 12 is a sectional view of the leading end portion of another supply nozzle according to the present invention.

FIG. 12 is a view of another supply nozzle 31 for use in the process of production according to the present invention. This supply nozzle 31 is manufactured through the same process as those in the other embodiments of the invention and similar in overall construction to the first embodiment of the invention, so that like reference characters designate like parts of the latter.

The supply nozzle 31 is a very small tube having a totally circular cross section and provided with not only a hole 31*a* having a diameter of 2ϕ through which the conductor 8 passes but also an external conical leading end portion 31*b*. The inner peripheral portion of the conductor passage hole 31*a* and the peripheral ridge 31*c* of the leading end of the tube are polished to provide a smooth curved surface. In addition, the peripheral ridge 31*c* has a recessed central part 31*e*, and protruded inner and inlet parts 31*d*, 31*f*. As a result, the conductor 8 is allowed to make contact with two places smoothly, namely the inner and inlet parts 31*d*, 31*f*, thus further reducing the possibility of causing the wire damage (including disconnection). In this practice of the invention, the inner diameter ϕ1 of the leading end of the supply nozzle 31 is set 1.7 times greater than the winding pitch P, whereby the slipping-off the groove is minimized.

The winding jig 21, though not limited to what is shown in FIG. 7, is preferably provided with the cavity groove 22 for use in resin injection molding by winding the recording electrode conductor thereon, wire holding grooves 25 formed in the protruded portions 23, 24 at the edges of the cavity grooves at predetermined pitches in a direction perpendicular to the lengthwise direction of the winding jig 21, orientation pins 26 for orientating the conductor 8, bundling pins 27 for bundling the wire materials into groups, and guiding pins 28 for guiding the bundles of wires to the groups of pins on the opposite side. There are arranged M×N pieces of wire holding grooves 25, for example, when recording electrodes in one row are formed with N sets of recording electrodes, each recording electrode set is intended to group M pieces of recording electrodes. More specifically, there are formed 7,040 pieces of wire holding grooves 25 in 55 sets with 128 pieces of them as one set. With respect to the number of grooves between the orientation pins 26, moreover, there are provided, for example, 2M (256) pieces of them. Further, M (128) pieces of wire-material bundling pins are provided so as to bundle 55 pieces of conductors 8 into one group, whereby the conductors 8 are distributed to 128 groups. M (128) pieces of guide pins 28 are also provided. The conductors 8 are wound on the winding jig 21 by means of the pins 26, 27, 28, and while N (55) pieces of them are grouped by the bundling pins 27, arranged with a predetermined pitch so that they are caused by the orientation pin 26 to cross the cavity groove 22 in the predetermined order.

In this practice of the invention, a pair of winding jigs 21 having the same construction are used in such a way that these jigs are placed opposite to each other to face the cavity grooves and that resin is injected therebetween to form the electrode support block.

The winding jigs 21 and wire-material supply means 30 are used to manufacture the multi-stylus recording head of FIGS. 1~3 as follows:

First, the control electrodes 3, 4 and so forth are placed in the cavity groove 22 of the winding jig 21 using support plates. Subsequently, the winding jig 21 is rotated or rocked, whereas the conductor supply nozzle 31 of the wire-material supply means 30 is moved in the axial direction, so that the conductor 8 is selectively wound on the pins 26, 27, 28 of the winding jig 21. The conductor 8 is then wound into the wire-material holding grooves 25 and stretched across the cavity groove 22 with the predetermined pitch. At this time, the conductor 8 is moved reciprocally and linearly in the longitudinal direction of the nozzle 31 by a magnetic scale slider 32 interlocked with the rotation of the winding jig 21 from one end to the other end of the winding jig 21 with an alternated pitch. In other words, all the odd-numbered recording electrodes 1, . . . , 1 are first wound and the separator member 11 is put on them and then the even-numbered recording electrodes 1, . . . , 1 are wound. In the case of this embodiment of the invention, the conductor 8 is wound by unidirectionally turning the winding jig 21 once; however, the present invention is not limited to this practice but may be applied to the method of winding the conductor 8 semicircularly by fastening it on the predetermined pins while the winding jig 21 is being rocked.

The conductor 8 is wound into all M×N (7,040) pieces of wire-material holding grooves 25 and arranged in order. Then both the winding jigs 21 having the same construction are placed opposite to each other to face the cavity grooves 22, and insulating resin is injected therebetween to form the electrode support block 5.

Then the conductors 8 thus bundled on a group basis between the guide pins 28, 28 are soldered and the soldered portions are cut out. Further, the electrode support blocks 5 and the conductors 8 are taken out of the winding jigs 21.

In this practice of the invention, the adjoining recording electrodes at the stage before the separator member 11 has not been inserted yet shift from each other in the breadthwise direction for certain to the extent of the thickness of the layer 9 in which the odd-numbered conductors 8 are stacked up, that is, the total thickness of (M/2)×N (=3,520) pieces of conductors 8.

Figure 4:
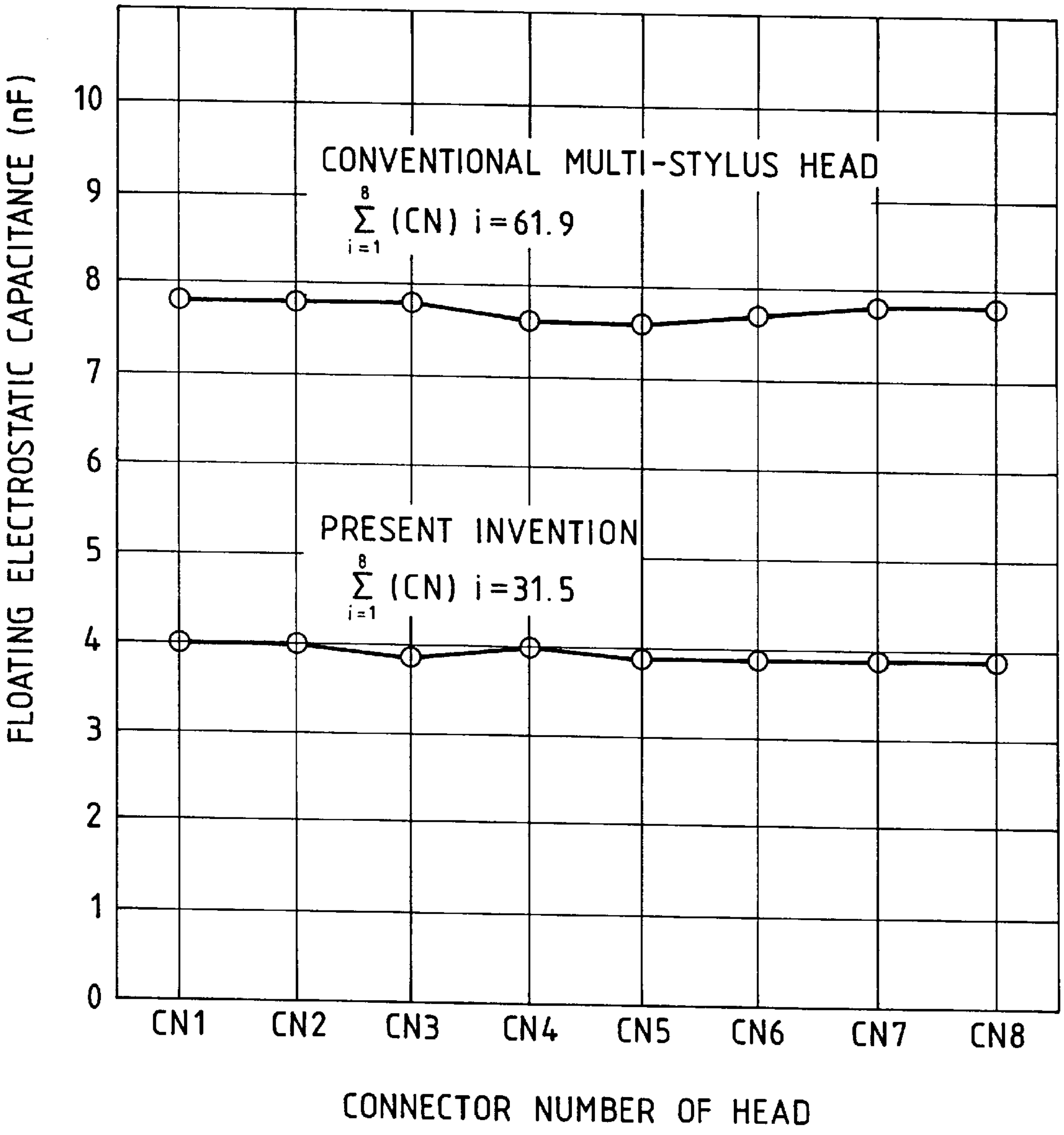
FIG. 4 is a graphic representation showing a comparison of measured values of floating electrostatic capacitance in the conventional multi-stylus recording head of FIG. 14 and what embodies the present invention in FIG. 1.
Figure 14:
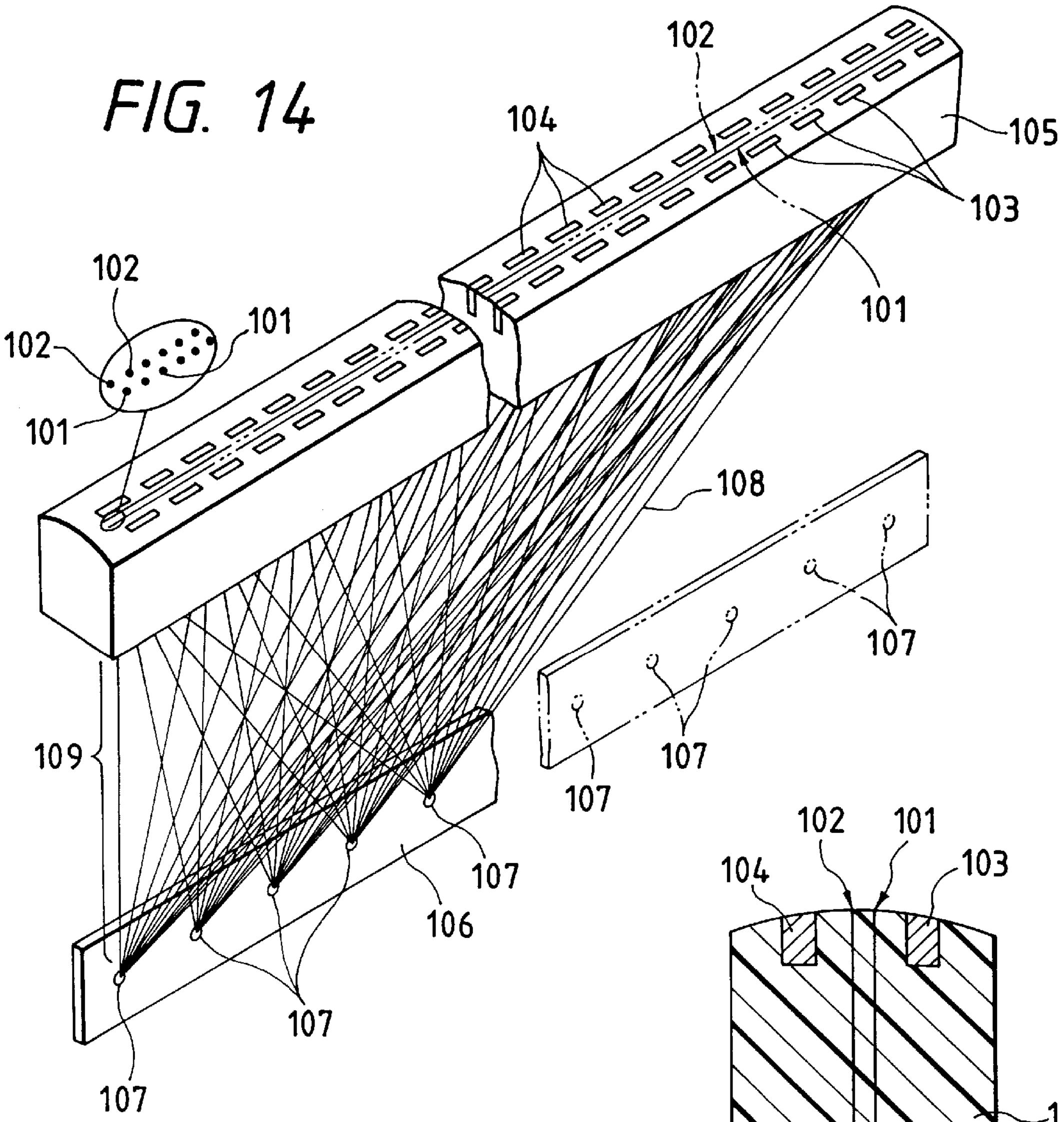
FIG. 14 is a perspective view of a conventional multi-stylus recording head.
Figure 15:
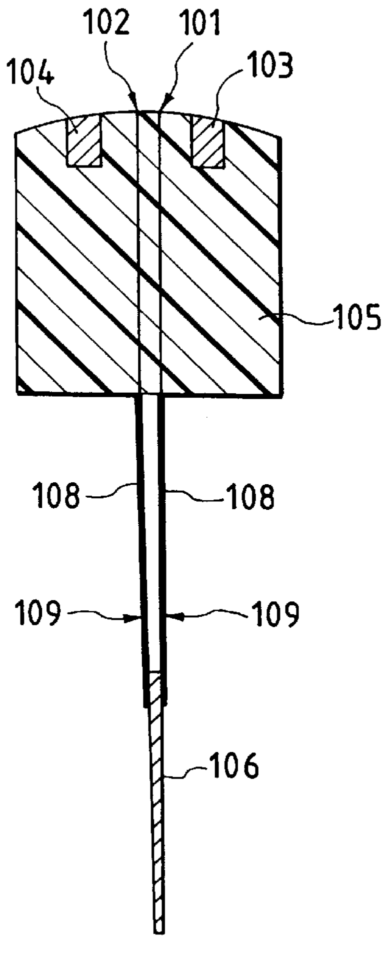
FIG. 15 is a transverse sectional view of the conventional multi-stylus recording head.
Figure 16:
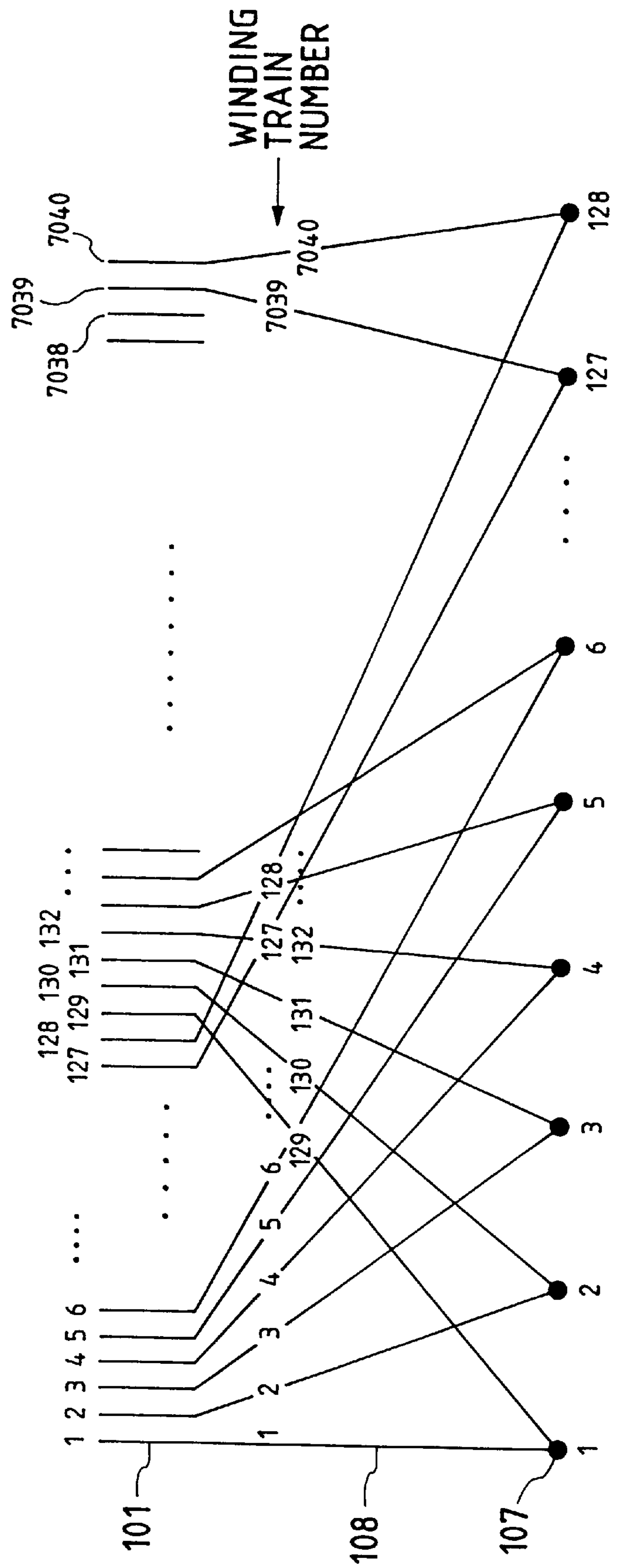
FIG. 16 is a conductor wiring diagram illustrating a method of winding a conductor of the conventional multi-stylus recording head.
Figure 17A:
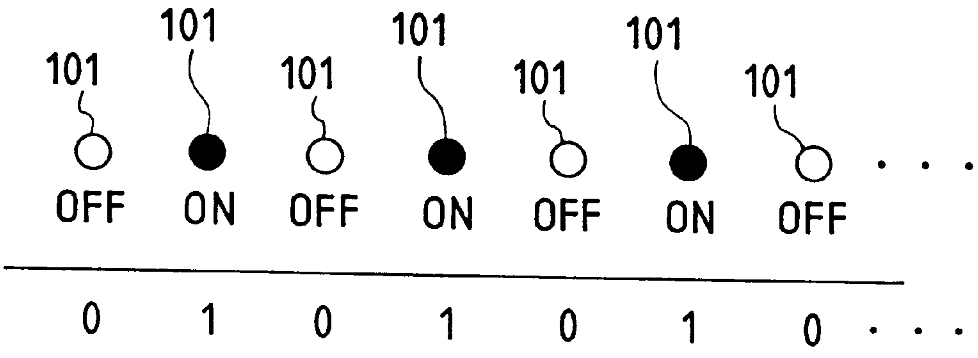
FIG. 17(A) is a view of a 0101 recording pattern indicative of a situation in which applied voltage is likely to drop in a case where recording electrodes are set in single rows.
Figure 17B:
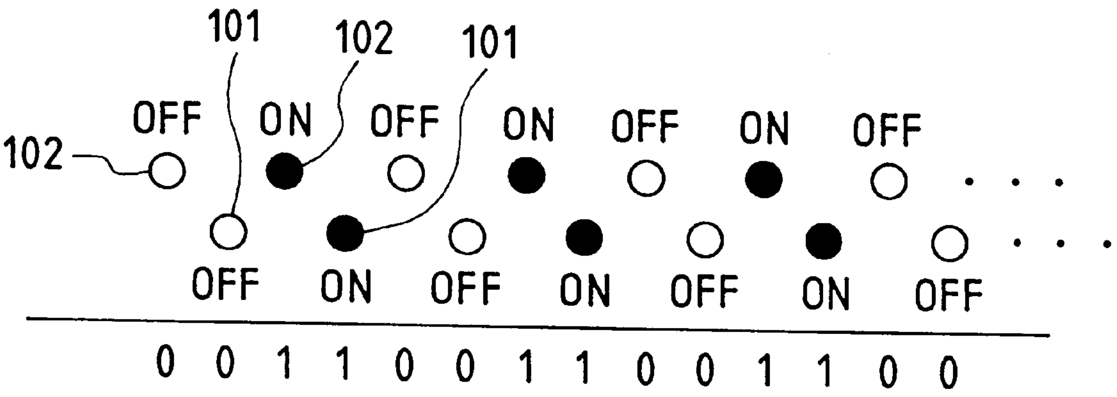
FIG. 17(B) is a view of a 0101 recording pattern indicative of a situation in which applied voltage is likely to drop in a case where the recording electrodes are set in plural rows.
Figure 18:
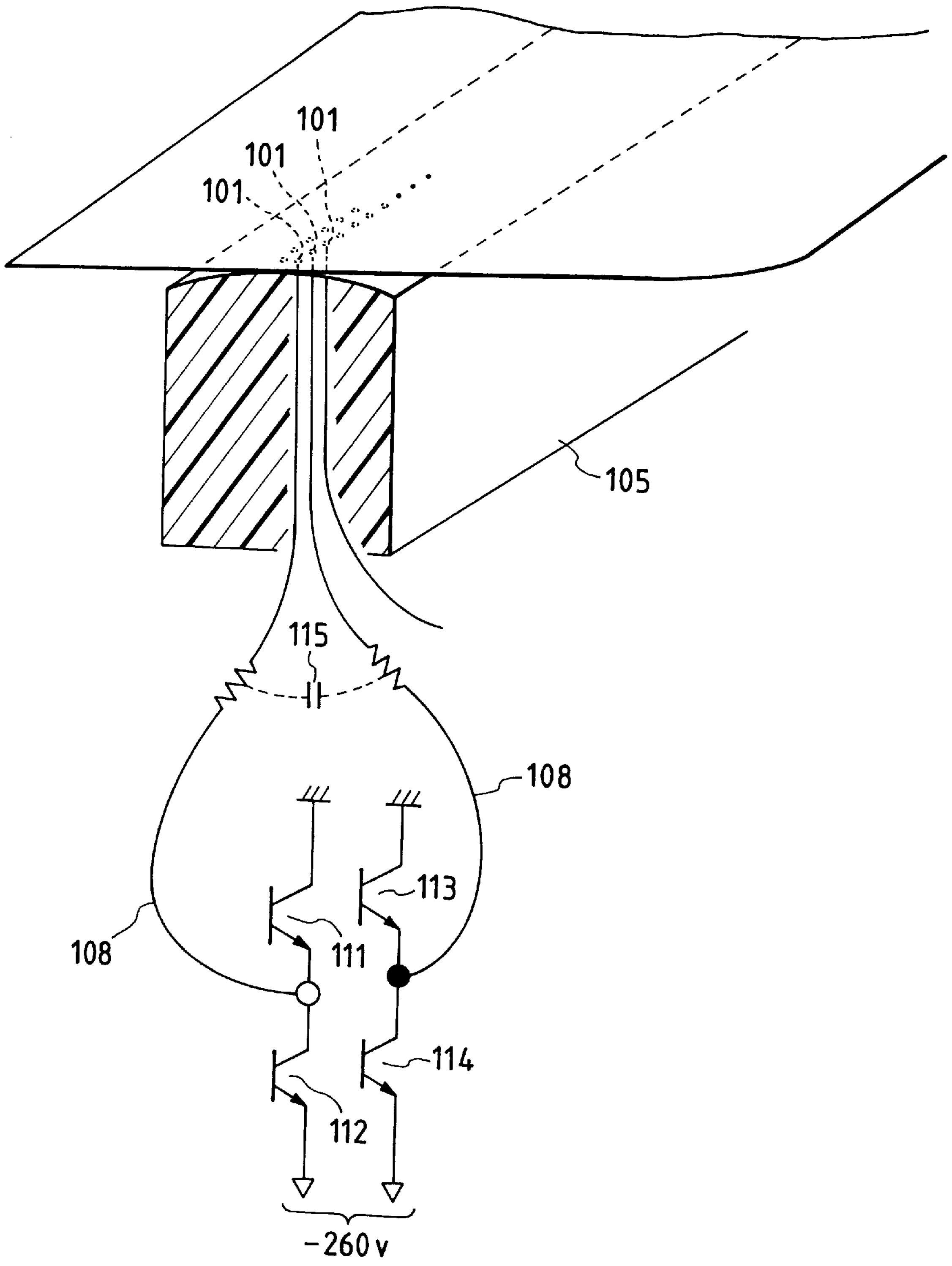
FIG. 18 is a circuit diagram illustrating the dropping of the applied voltage.
Figure 19:
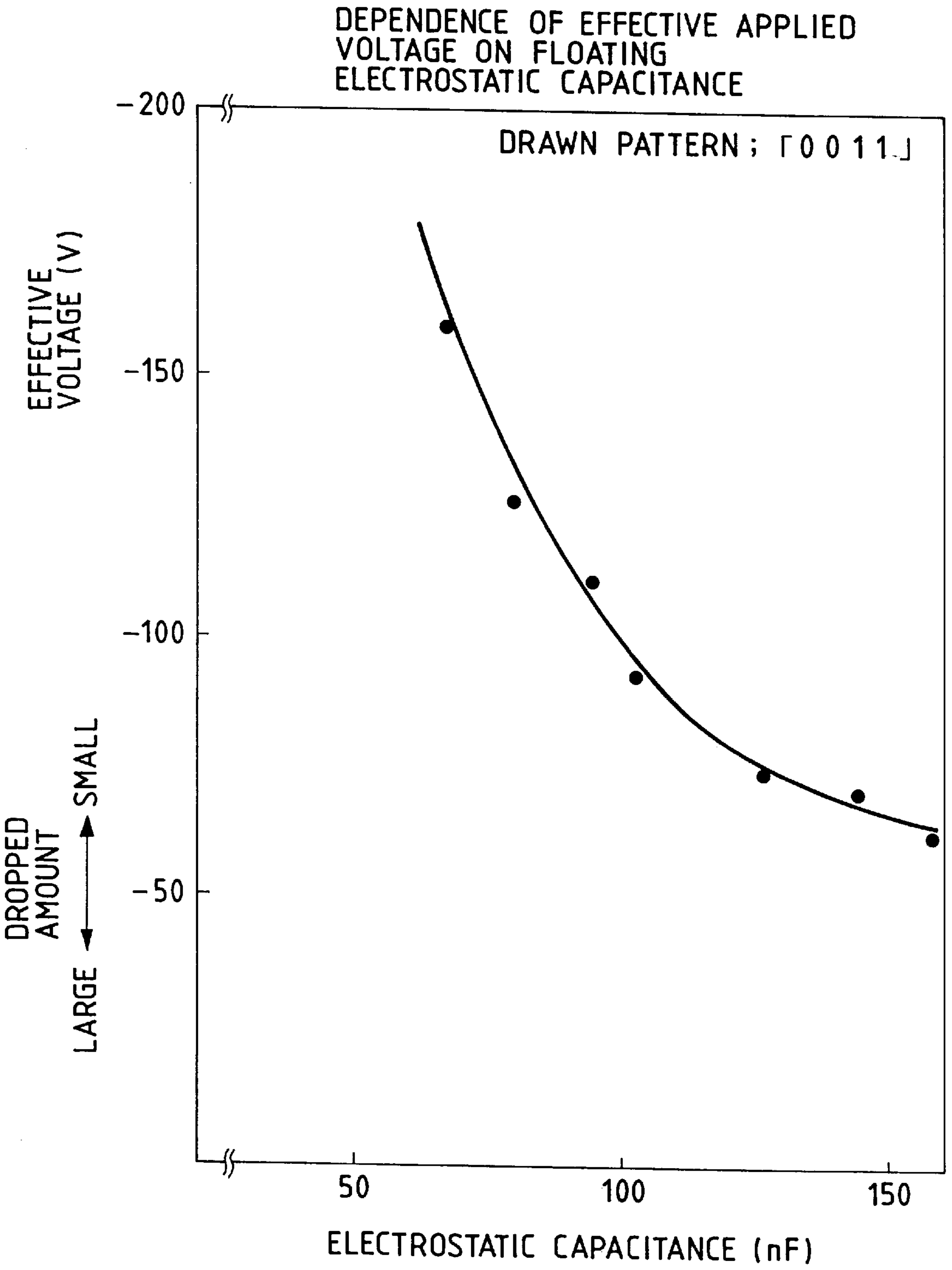
FIG. 19 is a graphic representation with the x-axis representing floating electrostatic capacitance and with the y-axis representing the effective values of applied voltage to indicate the dependency of the effective applied voltage on the floating electrostatic capacitance.

When the floating electrostatic capacitance of each of the recording electrodes 1, 2 according to the present invention is measured, the measured values each become roughly halved as shown in FIG. 4 in comparison with the conventional ones of FIGS. 14, 15. Even in the state in which the separator member 11 has not been inserted, the floating electrostatic capacitance is seen to decrease. The floating electrostatic capacitance thus reduced prevents the driving voltage waveform from becoming dull, thus making it possible to apply adequate voltage. Consequently, various planar patterns (not characters but imaging patterns such as pictures) can be drawn. Moreover, no excessive current does not flow at the time a driving pulse rises and the load applied to the driver IC lowers. Therefore, the freedom of elements for use increases, which results in not only cost reduction but also improvement in quality stability. Thus the dropping of applied voltage is reduced and sufficient image quality density is made obtainable.

Even when a multiplexing drive system for operating a plurality of recording electrodes by driving one driver IC in conformity with the timing of time-division scanning is employed, high image quality is available as unevenness in vertical-striped drawing resulting from the floating electrostatic capacitance is reduced. Reduction in the floating electrostatic capacitance allows the multiplexing drive system to be employed, thus making possible a decrease in the number of driver ICs, cost reduction and improvement in quality stability.

Figure 5:
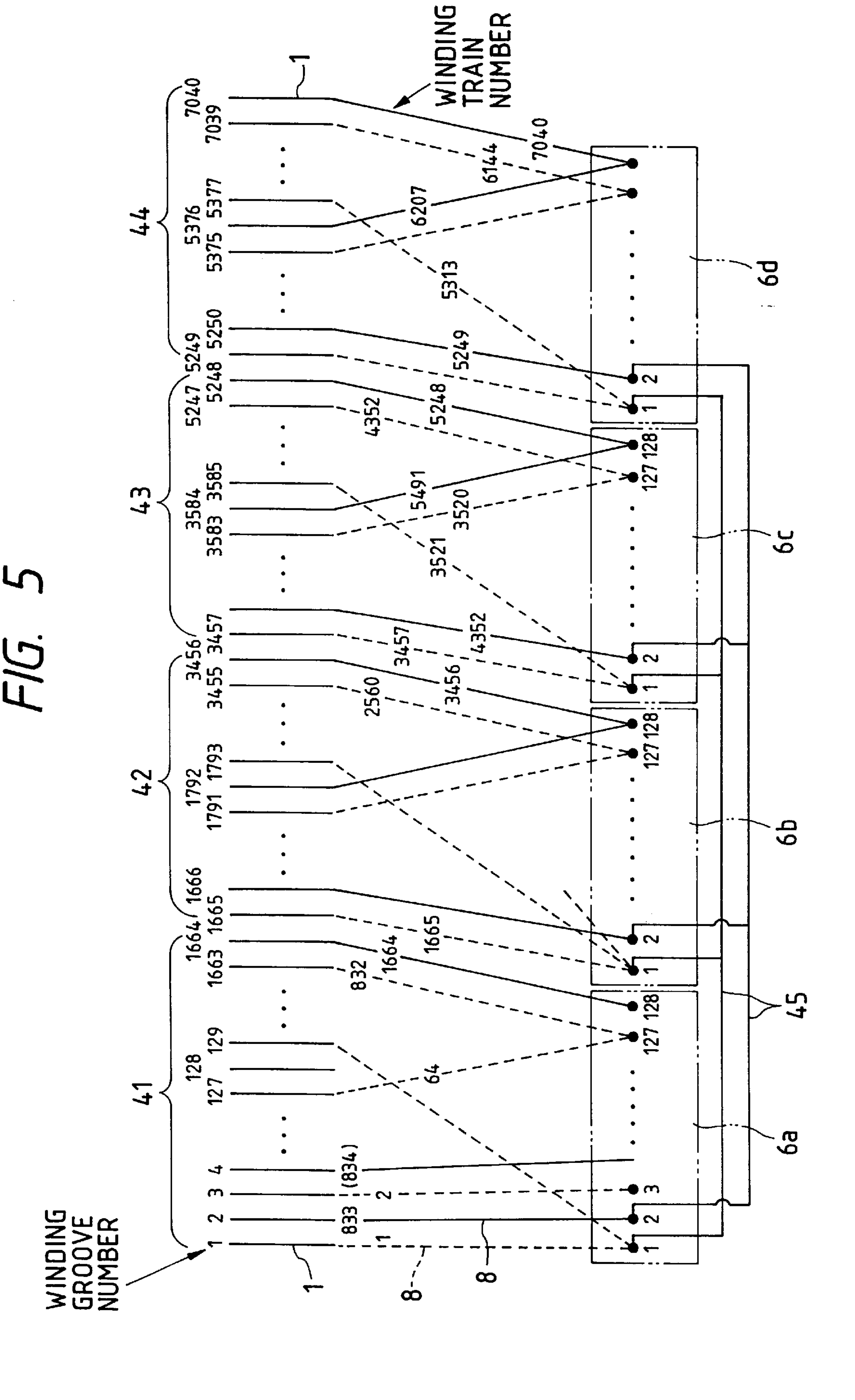
FIG. 5 is a conductor wiring diagram illustrating another method of winding a conductor of the multi-stylus recording head according to the present invention.

The method of dividing recording electrodes into odd-numbered and even-numbered ones is not necessarily limited to the aforementioned and any other method may be employed. FIG. 5 is a view of another embodiment of the present invention. As shown in FIG. 5, the first and second recording electrodes 1, . . . , 1, 2, . . . , 2 of a multi-stylus recording head are divided into four blocks 41, 42, 43, 44 in the longitudinal direction, and wiring boards 6*a*, 6*b*, 6*c*, 6*d* are prepared for the respective blocks 41, 42, 43, 44. Odd- and even-numbered conductors 8, . . . , 8 are divided in the direction in which the conductors are stack up and wired.

Further, the odd- and even-numbered terminals of the four wiring boards 6*a*, 6*b*, 6*c*, 6*d* are mutually coupled together on a group basis.

To take an example from only the first recording electrodes, M×N (=7,040) pieces of recording electrodes in N (=55) sets with M (=128) pieces as one set are divided into four blocks 41, 42, 43, 44 for wiring purposes, each ranging from 1~1,664, 1,665~3,456, 3,456~5,248, 5,249~7,040. With respect to 1,664 pieces of recording electrodes 1, . . . , 1 in the first block 41, the odd-numbered conductors 8 are first wired so that these are connected to the odd-numbered terminals 7, . . . , 7 of the wiring board 6*a* having 128 terminals. In other words, the conductors 8 are distributed to connect the 1st–127th odd-numbered recording electrodes 1, . . . , 1 each to the terminals 7, . . . , 7; that is, the 1st recording electrode 1 is connected the 1st terminal 7, the 3rd recording electrode 1 to the 3rd terminal 7, and the 5th recording electrode 1 to the 5th terminal 7. Subsequently, the conductors 8 are distributed again to connect the 129th recording electrodes and those which follow to the 1st terminal 7; that is, 832 pieces of odd-numbered recording electrodes up to 1,663th recording electrodes are repeatedly and alternately connected to the odd-numbered terminals 7, . . . , 7 in 64 places. In this way, 13 pieces of odd-numbered recording electrodes 1, . . . , 1 are connected to each of the odd-numbered terminal 7, . . . , 7. At this time, 832 pieces of conductors 8, . . . , 8 are stacked up in the form of a cross-stitch to form the layer 9 like a sheet of woven stuff as a whole. Similarly, 832 pieces of 2nd–1,664th even-numbered conductors 8 are successively connected to 2nd, 4th, 6th, . . . , 128th even-numbered terminals 7, . . . , 7 in 64 places in total. Thus 1,664 pieces in the initial block 41 out of 7,040 pieces of the first conductors are sorted into the odd-numbered conductor layer 9 and the even-numbered conductor layer 10 in the direction in which they are stacked up.

Further, 1,792 pieces of recording electrodes in the respective blocks 42, 43 and 44 are successively connected to the odd-numbered terminals 7, . . . , 7 and the even-numbered terminals 7, . . . , 7 of the wiring boards 6*b*, 6*c*, 6*d* each having 128 terminals, whereby the odd- and even-numbered conductor layers 9, 10 are sorted in the direction in which the conductors are stacked up. In this case, 128 pieces of conductors connected to each terminal 7 are bundled form the group of 14 pieces.

The multi-stylus recording head thus completed has the recording electrodes 1 divided into four blocks in the longitudinal direction, the odd- and even-numbered layers 9, 10 divided in the direction in which the conductors are stacked up on the basis of blocks 41, 42, 43, 44, and the wiring boards 6*a*, 6*b*, 6*c*, 6*d* in the respective blocks 41, 42, 43, 44. Consequently, the terminals formed in each of the groups on the wiring boards 6*a*, 6*b*, 6*c*, 6*d* from the driving circuit standpoint are coupled by means of a jumper wire 45 and then connected to a connector or the like with N (=55) pieces as one set. The same procedure is applied to the wiring of the conductors 8 of the second recording electrodes 2 though the illustration has been omitted.

This method of winding has the same effect as that of the preceding example and besides the conductors 8 are made shorter than in the preceding case, so that the floating electrostatic capacitance is lowered further. In the case of this method of winding, half-turn or one-third-turn winding instead of quarter-turn winding may be employed.

Figure 6:
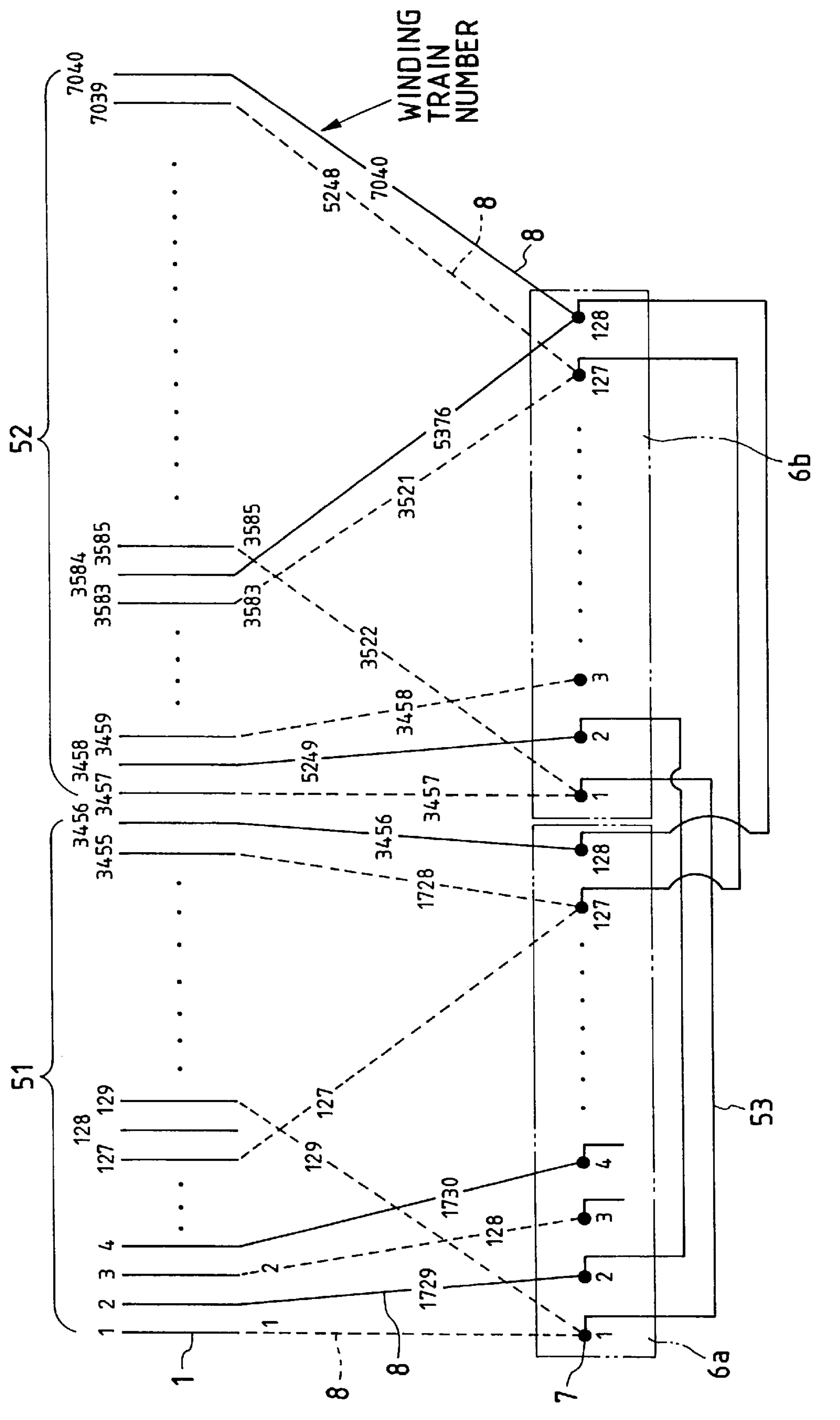
FIG. 6 is a conductor wiring diagram illustrating still another method of winding a conductor of the multi-stylus recording head according to the present invention.

Moreover, a method of dividing the recording electrodes into odd- and even-numbered ones as shown in FIG. 6 may also be employed.

The structure shown in FIG. 6 is such that 7,040 pieces of the first recording electrodes 1 are divided into a first group 51 having 3,456 pieces of 1st–3,456th recording electrodes and a second group 52 having 3,584 pieces of 3,456th–7,040th recording electrodes and these two groups are each connected to two sheets of wiring boards 6*a*, 6*b* having terminals in 128 places, the corresponding terminals being made to conduct via a link conductor 53. More specifically, odd- and even-numbered conductors 8, . . . , 8 in the first group 51 are each connected to odd- and even-numbered terminals 7, . . . , 7 in M places of one wiring board 6*a*, and odd- and even-numbered conductors 8, . . . , 8 in the second group 52 are each connected to odd- and even-numbered terminals 7, . . . , 7 in M places of the other wiring board 6*a*.

Through the same procedure as what is shown in FIG. 3, the odd-numbered first recording electrodes out of 3,456 pieces of them 1, . . . , 1 in the first group are successively and respectively connected to the odd-numbered terminals 7, . . . , 7 in M (=128) places of the wiring board 6*a* for the first group. In consequence, 1,728 pieces of odd-numbered recording electrodes•conductors 8, . . . , 8 are successively connected to the odd-numbered terminals 7, . . . , 7 in 64 places, that is, 27 pieces of recording electrodes are connected to each terminal 7. The conductors 8, . . . , 8 are stacked up in the form of a cross-stitch to form a layer 9 like a sheet of woven stuff as a whole. Further, the separator member 11 such as paper having a dielectric constant smaller than that of air is mounted on the layer 9 and through the same procedure as stated above, 1,728 pieces of the 2nd–3,456th even-numbered recording electrodes•conductors 8, . . . , 8 are wired together.

In the same manner, 3,584 pieces of the 3,456th–7,040th recording electrodes 1, . . . , 1 in the second group 52 are connected to the wiring board 6*b* for the second group. First, the odd-numbered conductors are each connected to the odd-numbered terminals 7, . . . , 7 in M (=128) places of the wiring board 6*b* for the second group, and 1,792 pieces of odd-numbered recording electrodes•conductors 8, . . . , 8 are successively connected to the odd-numbered terminals 7, . . . , 7 in 64 places, whereby 28 pieces of recording electrodes in total are connected to each terminal 7. The conductors 8, . . . , 8 are stacked up in the form of a cross-stitch to form the layer 9 like a sheet of woven stuff as a whole. Further, the separator member 11 such as paper having a dielectric constant smaller than that of air is mounted on the layer 9 and through the same procedure as stated above, 1,729 pieces of the 3,458th–7,040th even-numbered recording electrodes•conductors 8, . . . , 8 are wired together. Then the conductors 8, . . . , 8 are stacked up in the form of a cross-stitch to form the layer 10 like a sheet of woven stuff as a whole.

The terminals in 128 places of the wiring board 6*a* for the first group and those in 128 places of the wiring board 6*b* for the second group are connected together via the link conductor 53. By connecting one of the terminals 7 to the connector, 55 pieces of recording electrodes become connected to one terminal. The link conductor 53 for the purpose may be used similarly at the time the automatic conductor winding method already proposed by the present applicant in Japanese Patent Application No. 29165/1994 is conducted, and also applied to the wiring of the conductors 8 of the second recording electrodes (not shown).

Although a description has been given of the preferred embodiments of the invention, it is not limited thereto but may be modified without departing from the spirit and the scope of the invention. For example, the recording electrodes 1, . . . , 1 and the conductors 8, 8 may be formed of different members with coupling means provided therebetween. Moreover, the conductors 8, 8 may be divided into two, three or a plurality of layers in the breadthwise direction. When the head is divided into a plurality of blocks with odd- and even-numbered conductors, there may be employed not only a plurality of wiring boards with a jumper wire for connecting the terminals but also printed wiring for connecting such terminals on one sheet of wiring board.

Further, the arrangement of separating the odd- and even-numbered conductors of the recording electrodes in the direction in which the conductors are stacked up so as to form the different layers in this specification includes not solely the case where the odd- and even-numbered conductors are formed continuously from end to end of the head on one and the same side but also a case where these odd- and even-numbered conductors appear alternately and discontinuously. In the course of connecting the odd-numbered conductor from the leftmost end of the head to the terminal of the odd-numbered terminal with reference to the method of FIG. 3, for example, this step is switched to that of connecting the even-numbered conductor to the even-numbered terminal and the latter step of connecting the even-numbered conductor to the even-numbered terminal is kept up to the right end of the head. Then the step of connecting the even-numbered conductor to the even-numbered terminal is started from the left end of the head. Subsequently, the even-numbered conductor is switched to the odd-numbered conductor this time in the halfway of the head so as to connect the odd-numbered conductor to the odd-numbered terminal up to the right end of the head. In the case of wiring like this, odd-numbered/even-numbered division in the left-hand half and even-numbered/odd-numbered division are established in the direction in which the conductors are stacked up. Although the odd-numbered/even-numbered division appears effective as a whole in this case, the odd-numbered conductor is, strictly speaking, set adjacent to the even-numbered conductor only at one place halfway in the lengthwise direction of the head. Since the floating electrostatic capacitance is halved at the remaining 7,039 places, the effect of reducing the floating electrostatic capacitance generated in the whole head is set almost free from being badly affected. Even in the example shown in FIG. 5 where the odd-numbered conductor is switched to the even-numbered one in each block, the effect of reducing the floating electrostatic capacitance is affected only to a ignorable extent as viewed from the head on the whole, which is essentially equivalent to the formation of different layers resulting from dividing the odd- and even-numbered conductors of the recording electrodes in the direction in which they are stacked up as referred to in the present specification and the scope of claims for patent.

As set forth above, the odd- and even-numbered conductors of the recording electrodes in the multi-stylus recording head are divided in the direction in which the conductors are stacked up to form the different layers according to the present invention. Therefore, the distance between the adjoining conductors of the recording electrodes is increased (the space being widened) and the floating electrostatic capacitance is reduced. According to the experiments made by the present inventors, the floating electrostatic capacitance has been roughly halved in comparison with the conventional construction of FIG. 14. Thus the driving waveform and the applied voltage are each prevented from becoming dull and dropping, so that high-quality drawing becomes possible.

As the separator member having a low dielectric constant is inserted in between the conductor layers, the distance between the conductors corresponding to the adjoining recording electrodes is lengthened further to ensure that the distance is maintained and the possibility of narrowing the distance is eliminated. Thus drawing with higher image quality and stability becomes possible.

According to the present invention, further, the movement of the conductor drawn out of the supply nozzle is regulated within one pitch in the conductor passage hole, whereby the conductor is wound in position as designated without being led to a place equivalent to the adjoining pitches. Therefore, the pitch is always restrained from being put out of order, and not only conductor arrangement precision but also productivity is rendered greatly improvable.

Moreover, the conductor drawn out of the supply nozzle is smoothly drawn out without being stuck in the conductor passage hole, so that wire damage (including disconnection) and the level of defectiveness are greatly reduced.

Further, the freedom of the movement of the conductor drawn out of the supply nozzle is not restricted even though the peripheral ridge of the supply nozzle outlet is chamfered into a curved surface, whereby the conductor can be wound in position.

In addition, since the process of producing the multi-stylus recording head according to the present invention includes winding the conductor by using the supply nozzle having the conductor passage hole whose inner diameter at its leading end is set not greater than twice the winding pitch, the motion of the conductor in the conductor passage hole of the supply nozzle is regulated with the effect of allowing the conductor to be wound in position and consequently any defective resulting from the slipping-off the groove is minimized. Consequently, it is possible to obtain a multi-stylus recording head with excellent precision in the arrangement of conductors and improved recording accuracy.

What is claimed is:

1. A multi-stylus recording head comprising a block and a plurality of terminals, conductors being connected between said block and said terminals, said block having electrodes formed by end faces of said conductors, said recording head comprising:

a set of electrode groups each having M conductors with a predetermined pitch therebetween, N sets of electrode groups arranged so that end faces of said conductors are disposed in a single line, terminals comprising odd-numbered and even-numbered terminals, each one of said odd-numbered terminals being connected to N conductors all having the same odd-numbered position in each of said N sets of electrode groups as the odd-numbered terminal to which said N conductors are connected, and each one of said even-numbered terminals being connected to N conductors all having the same even-numbered position in each of said N sets of electrode groups as the even-numbered terminal to which said N conductors are connected, the total number of said odd-numbered and even-numbered terminals is M, said odd-numbered and even-numbered terminals form odd-numbered terminal groups and even-numbered terminal groups, respectively, and the conductors connected to said odd-numbered terminal groups are crossed to form a first woven layer, and the conductors connected to said even-numbered terminal groups are crossed to form a second woven layer which is separated independently from said first woven layer.

2. The recording head recited in claim 1, comprising a plurality of blocks each having said N sets of electrode groups.

3. The recording head recited in claim 1, further comprising a separating member having a low dielectric constant, said separating member being disposed between and separating said first and second woven layers.

4. A method of manufacturing a multi-stylus recording head that includes N sets of electrode groups each having M conductors with a predetermined winding pitch therebetween, the N sets of electrode groups being arranged so that end faces of the conductors are disposed in a single line, said method comprising steps of:

among the M conductors in said electrode groups, winding N sets of one of odd-numbered and even-numbered conductors on a winding jig, and connecting said one of odd-numbered and even-numbered conductors to respective terminals, and thereafter winding N sets of an opposite one of the odd-numbered and even-numbered conductors on the winding jig, and connecting said opposite one of the odd-numbered and even-numbered conductors to respective terminals.

5. The method recited in claim 4, further comprising steps of:

winding a conductor corresponding to one odd-numbered or even-numbered position of an electrode of each of the N sets of electrode groups onto a corresponding odd-numbered or even-numbered position of a wire holding groove of the winding jig, and connecting an end portion of the conductor to a corresponding odd-numbered or even-numbered position terminal, moving a nozzle through which the conductor is supplied to the winding jig, winding the conductor on a next one of the odd-numbered or even-numbered position wire holding grooves of the winding jig and connecting the end portion of the conductor to a corresponding odd-numbered or even-numbered position terminal, repeating said winding, moving and winding steps in the recited order for the N sets of electrode groups so that the conductor is wound on all of the odd-numbered or even-numbered position wire holding grooves and connected to the corresponding odd-numbered or even-numbered position terminals, thereby forming a conductor layer, and performing said winding, moving, winding and repeating steps in the recited order for the opposite one of the odd-numbered and even-numbered position wire holding grooves and corresponding odd-numbered or even-numbered position terminals.

6. The method recited in claim 5, wherein said moving step comprises shifting the nozzle by an amount equal to the distance between every other wire holding groove starting from one end of the winding jig and finishing at an opposite end of the winding jig.

7. The method recited in claim 4, further comprising steps of:

successively winding the conductors on one of odd-numbered and even-numbered position conductor winding positions of said N sets of electrode groups until the conductors are wound on all of the odd-numbered or even-numbered position conductor winding positions, successively winding the conductors on an opposite one of the odd-numbered and even-numbered position conductor winding positions, and connecting N conductors to the same terminal until the conductors are wound on remaining ones of the odd-numbered or even-numbered position conductor winding positions.

8. The method as recited in claim 4, wherein the nozzle has a hole through which the conductors pass, and the diameter of the hole is not more than twice as large as a winding pitch of the conductors.

9. The method recited in claim 4, further comprising a step of passing the conductors to the winding jig via a conductor passage hole formed in a supply nozzle, the conductor passage hole having a peripheral ridge with a curved surface, the curved surface having a radius of curvature R within the following range:

$(1/100)\ \phi 2 \leqq$ curvature radius R of the curved surface of the peripheral ridge $\leqq (1/2)\ \phi 2$ where $\phi 2$ = an inner diameter of the conductor passage hole of the supply nozzle.

10. The method recited in claim 4, further comprising a step of passing the conductors to the winding jig via a conductor passage hole formed in a supply nozzle, wherein the inner diameter of a leading end of the conductor passage hole of the supply nozzle is approximately 1.2 times the predetermined winding pitch.

* * * * *